Jan. 11, 1966      O. STÜRZINGER ETAL      3,229,037
CODING AND DECODING APPARATUS
Filed Nov. 6, 1961                         2 Sheets-Sheet 2 the quick brovvn fox jumps over the lazy dog  kaufen sie jede vvoche
vier gute bequeme pelze bei xy  voyez le brick geant que j examine
pres du vvharf  novv is the time for all good men to come to the aid
of the party bxj  stanleys expeditionszug quer durch afrika vvird
von jedermann bevvundert  apportez moi de ce vieux vvhisky que j ai
bu chez le forgeron du coin  etc

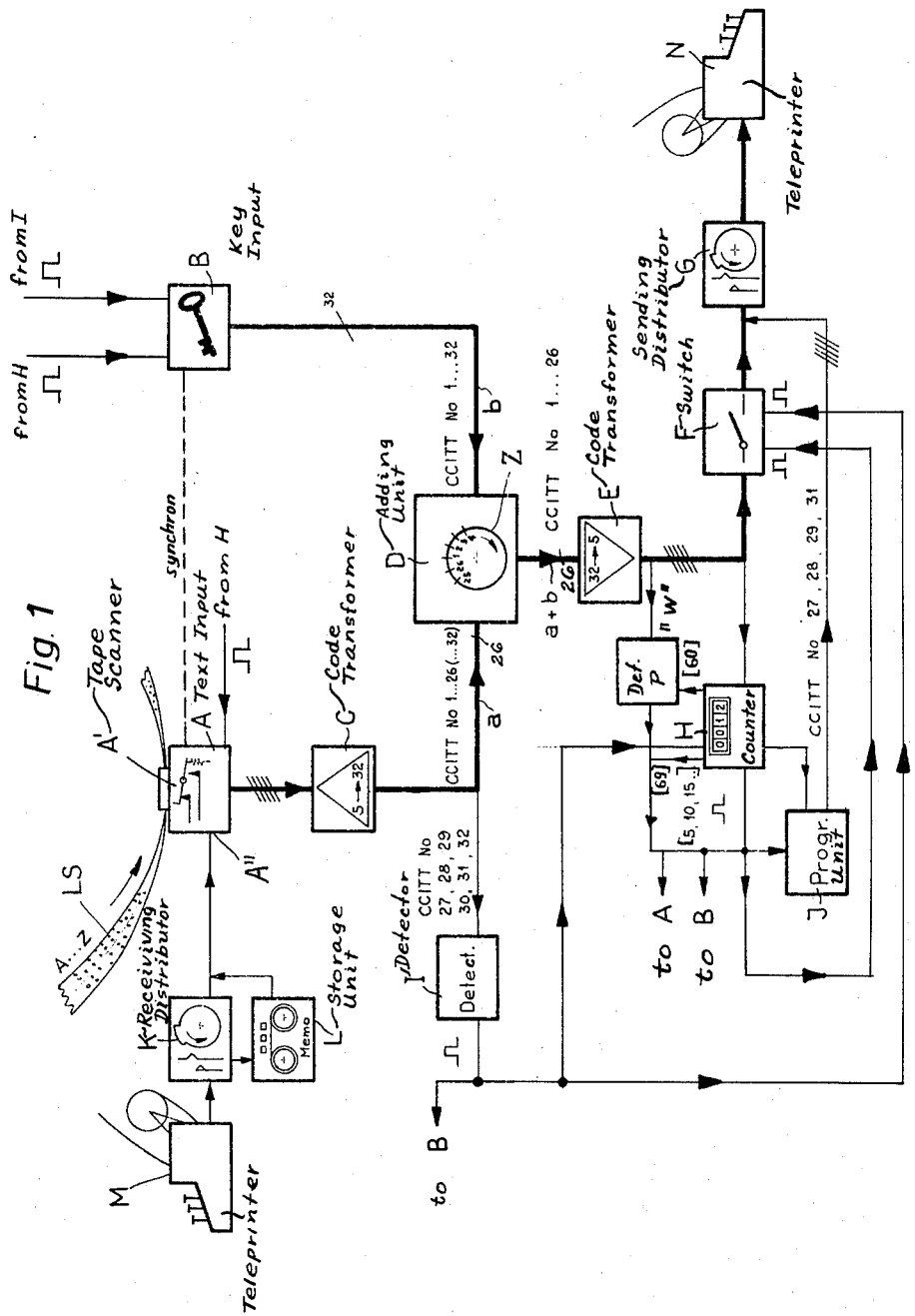

*Fig. 2*

```
sdafg  wuegd  vvbnd  llpok  adyrq  xxbsu  eerts  vjiop  qqade  utgdf
zzwhs  ccndj  ioprf  bvcxy  afdsw  uztre  poiuh  ngtrd  yfres  pbdxf
huiom  cfred  nbvfg  hhutz  gdsaw  oiuzt  fcdrt  xsedr  frtzg  awert
ihfcd  bhuio  sedrw  aysxd  cfvgb  hnjuz  tfrde  swedx  pjhgf  awert
bvcdf  ghuzt  rewsy  hbvcf  ksdra  ophui
```

*Fig. 3*

SDAFG  WUEGD  VVBND  LLPOK  ADYRQ  XXBSU  EERTS  VJIOP  QQADE

UTGDF<≡ZZWHS  CCNDJ  IOPRF  BVCXY  AFDSW  UZTRE  POIUH  NGTRD

VFRES  PBDXF<≡HUIOM  CFRED  NBVFG  HHUTZ  GDSAW  OIUZT  FCDRT

XSEDR  FRTZG  AWERT<≡IHFCD  BHUIO  SEDRW  AYSXD  CFVGB  HNJUZ

TFRDE  SWEDX  PJHGF  AWERT<≡BVCDF  GHUZT  REWSY  HBVCF  KSDRA  OPHUI

*Fig. 4*

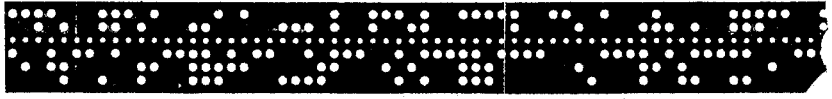

*Fig. 5* the quick brovvn fox jumps over the lazy dog  kaufen sie jede
vvoche vier gute bequeme pelze bei xy  voyez le brick geant que
j examine pres du vvharf  novv is the time for all good men to
come to the aid of the party bxj  stanleys expeditionszug quer
durch afrika vvird von jedermann bevvundert  apportez moi de
ce vieux vvhisky que j ai bu chez le forgeron du coin  etc

*Fig. 6*

INVENTORS
OSKAR STÜRZINGER
JEAN DUBOIS
BY Albert C. Johnston
ATTORNEY

United States Patent Office 3,229,037
Patented Jan. 11, 1966

3,229,037
CODING AND DECODING APPARATUS
Oskar Stürzinger, Baar, and Jean Dubois, Zug, Switzerland, assignors to Anstalt Europaische Handelsgesellschaft, Vaduz, Liechtenstein
Filed Nov. 6, 1961, Ser. No. 150,367
Claims priority, application Switzerland, Nov. 7, 1960, 12,431/60
12 Claims. (Cl. 178—22)

The present invention relates to an apparatus for coding and decoding a clear or coded text, respectively, which consists of letters and is laid down in teleprinter code symbols, said apparatus comprising inlet means for the text, inlet means for the key information, and outlet means.

According to present teleprinter coding practice, it is usual to process the text by combining, on one hand, the text information, and on the other hand, the key information, both of which are rendered available in the five-unit symbol code (wherein each unit is either of two signs) known as CCITT Code No. 2, whereby the text and key informations are added together according to the rules of binary calculus, or combined according to the rules of sign multiplication. The result always is another five-unit combination or symbol of the CCITT Code No. 2. It will be understood that in such a coding process, if the choice of the key is left free, a text consisting of letters only is not necessarily converted into a text which also consists of letters only, but can only be converted into a coded text which may comprise all 32 combinations or symbols of the five-unit code. Such a coded text can readily be transmitted by means of conventional teleprinting equipment but it cannot be printed since the combinations Nos. 27 to 32 of the CCITT Code No. 2 represent no printable signs but only technical control operations. In direct teleprinter transmission, this is irrelevant since the coded text is in the form of pulses only during its transmission and since at the receiving station it is directly decoded or punched into a tape which can receive all 32 five-unit combinations and from which the text will be decoded by means of a scanner in local operation.

However, the transmission of a coded text containing all combinations of the CCITT Code No. 2 by telegraph is not possible, because according to international telegraph rules only texts consisting entirely of letters or other conventional printable figures may be transmitted. The introduction of printed symbols for the technical signals of course would permit transmission of the coded message by mail, courier, facsimile telegraphy, and the like, but the transmission of the coded text over the public telegraph system nevertheless would remain excluded.

For this reason, secret messages which are to be transmitted over the public telegraph system or in Morse code, must first be coded by means of purely mechanical or electromechanical coding equipment which is entirely independent from the line in order to produce a coded text which contains only alphabet letters. Such coding equipment operates only on the twenty-six letters of the latin alphabet, one of which is mostly used as the spacing signal. More particularly, position numbers in the alphabetic order, or other numerical values ranging from 1 to 26 are attributed to the individual letters of the alphabet or signals of the coding key, whereupon the information is treated by addition or subtraction of the numerical values. For instance, the text letter "F" having in the alphabetic order the value 6 and the key signal "Y" having the value 25 furnish together the code information 31 which in the 26-letter alphabet corresponds to the letter having the value 31−26=5, that is, in the alphabetic order, the code letter "E."

Such coding equipment usually is rather slow and moreover does not permit taking full advantage of such direct teleprinter connections as are available.

It is an object of the present invention to obviate this drawback and to provide an apparatus which, although directly operatable in a teleprinter system as well, only produces coded texts which consist of the letters of the alphabet and thus can be transmitted by means other than such a teleprinter system, such means including, for instance, the public telegraph system.

The invention is based, among others, on the finding that it is permissible for the key to contain any of the combinations occurring, e.g., in the CCITT Code No. 2, that is, more than only the (e.g., twenty-six) signals corresponding to the letters of the alphabet in the particular code, provided the coded information formed by combining a text information with the key information is determined by using a modulus which is equal to the number of letters of the considered alphabet.

The invention will now be explained in more detail with reference to the accompanying drawings, in which:

FIG. 1 is a block diagram of an embodiment of the invention;

FIG. 2 represents the clear text of a message to be transmitted;

FIG. 3 represents the coded text derived from FIG. 2, as printed by a page printing apparatus, the subdivision of the text into lines being shown as it appears on the printed page;

FIG. 4 represents the same coded text derived from FIG. 2, as printed by a tape printing apparatus on a continuous tape, the text being shown, however, in several lines of arbitrary length for space reasons;

FIG. 5 represents the initial portion of a tape having the same coded text derived from FIG. 2, punched into it by a tape punching apparatus; and FIG. 6 shows the text when decoded again from any one of the coded forms shown in FIGS. 3, 4 and 5. whereby it has been reconducted into the language shown in FIG. 2.

The layout of the apparatus shown in FIG. 1 will now be described along with its operation for more clarity and simplicity.

The input device A is equipped with a perforated tape scanner A' and with a connection A" for a five-channel input lead carrying the text in the form of signals in the conventional teleprinter five-unit code. The signals are scanned at A' from a perforated tape LS into which the text has been punched, for example in the form of the conventional teleprinter symbols, without any other signals than the alphabet letters A to Z, including the letter W which serves as a "space" signal. The signals obtained by such scanning are conducted by a five-channel conductor to a code-transforming repeater C constructed as a diode matrix, which for example may be of the type described in "Etude Logique des Circuits Electriques," by Higonnet and Gréa, Berger Levrault, Paris, 1955, page 345, et seq., and arranged for redistributing the teleprinter signals according to the alphabetic order number of the respective letter and feeding them to the individual conductors 1 to 26 of a strand $a$ comprising 32 conductors, the last six of which serve a purpose which will appear later on. Through these conductors, the signals, each of which may have the form of a train of pulses produced as by a conventional teleprinter M or the tape scanner A', are fed into an adding unit D. In each train of pulses, the number of pulses is equal to the order number of the respective channel and thereby to the order number of the respective letter in the alphabet.

The apparatus further comprises a key input device B which is operated in synchronism with the input device A to deliver a coding key signal for each letter symbol delivered by the input device A through the code-transforming repeater C. These coding key signals may have been supplied by a so-called camouflage key tape or produced by a key-generating unit. In addition to a key tape scanner similar to the scanner A' in the input device A, the key input device B may comprise a diode matrix of the same kind, referred to above, as the matrix C associated with the input device.

The coding key signals are fed into the adding unit D in digital form, e.g., as trains of pulses, through 32 conductors of a strand $b$. Here again, the number of pulses in each train is equal to the order number of the respective conductor through which the train of pulses is fed. Of course, the key signal thus can be any one of 32 different signals.

The adding unit D may for instance consist of a clock generator, i.e., an oscillator and an assembly of two sets of digital counters, which may be of the well-known electromagnetic switch type as used for instance in telephone exchanges, or it may be of an electronic type such as the Philips Preset Counter No. 88930/33. The first of these two counters, indicated at Z, is the "mixing" counter, the second (not shown), is the "counting" counter. Each has a modulo 26 cycle, that is, after 26 steps its position is the same as initially.

If now a letter, for instance "F" coming from the input device A through the matrix C is fed through one of the conductors of the strand $a$ into the adding unit D, this letter will be recorded at the first counter Z as digit "6" by stepping the counter to the position "6." The key information emanating from the key input device B will step the said second counter, for example, to "12." The "mixing," which is the actual ciphering operation, will now be effected by stepping the first pulse counter Z forward and the second pulse counter backward, until the second counter is in its rest position again. This happens, in the present example, after 12 steps, which the first counter also has effected in addition to the 6 steps through which it was stepped initially. The first counter thus has effected $6+12=18$ steps, which corresponds to the letter "S." It will be understood that the result of the counting is again a train of pulses in which the number of pulses does not exceed 26 and which therefore always can represent a letter of the alphabet. This letter, which in the process of coding is the coded letter, is determined in a further code-transforming repeater E into which the resulting pulse trains are fed from the adding unit D through a 26-conductor strand designated $a+b$. In this code-transforming repeater E, which is similar in construction to the code-transforming repeater or diode matrix C but is operated in the opposite sense, and accordingly may be of the type described in the abovementioned book by Higonnet and Gréa, page 345, et seq., the resulting pulse trains are converted into the five-unit code, whereupon they are fed through five conductors into a conventional multiplex sending distributor G which feeds the information, in the five-unit teleprinter code, to a teleprinter N connected to the output of the apparatus. Between the code transforming repeater E and the sending distributor G there is a circuit-breaker switch F which may be a relay with five contacts, one for each of the five conductors carrying the information from E over to G. When the switch F is closed, the sending unit will deliver the pulse train representing the letter in question, while when the switch F is open, the letter is not transmitted to the sending distributor G. The teleprinter N may be at the receiving station at the far end of the transmission line. As already mentioned, the information which is converted into printed form by the teleprinter N contains only letters and therefore can also be forwarded by telegraph if desired.

The coded letters delivered by the code-transforming repeater E to the circuit-breaker switch F are counted in a counter H. This counter is equipped with means of known construction for delivering, after every fifth symbol representing a coded letter, a blocking signal (symbolized in the drawing as a rectangular pulse) to the text input device A, the key input device B, and the circuit-breaker switch F, and another signal to a program unit J, as shown by arrows in the drawing. To avoid crowding of the latter, the connection lines from the counter H to the input devices A and B are only shown at their beginnings and at their ends. The program unit J, which closely cooperates with the counter H, may comprise relays having up to five contacts each, one relay for each of the CCITT code signals Nos. 27 to 32. On transmission of the blocking signal from the counter H to the circuit-breaker switch F, the latter interrupts the transmission of letter information to, and accordingly by, the sending distributor G. Simultaneously, the input devices A and B are put out of operation, i.e., feed of the information carrying means such as a perforated tape, is stopped. In their place, the counter H urges the program unit J to deliver into the sending distributor G twice the CCITT signal No. 31 ("space"). Thereupon, blockage of the units A, B and F is automatically terminated and further five symbols are transmitted, whereupon the counter H again delivers its signal to A, B, F and J. Moreover, means are provided whereby each time ten such groups of five symbols representing coded letters have been transmitted, the program unit J is caused to deliver to the transmitting distributor G once the CCITT signal No. 27 for "carriage return" and once the CCITT signal No. 28 for "line feed," instead of twice the "space" signal.

After such coding, the clear text represented in FIG. 2 will be printed, for example, in the tabulated coded form according to FIG. 3, if the teleprinter N connected to the apparatus is a page printing device. If the teleprinter N is a tape printing device, the text will appear in one continuous line of which FIG. 4 shows five consecutive sections. On the other hand, if only a tape punching device is connected to the sending distributor G, the coded text will be laid down in the form of perforations in a tape as shown in FIG. 5. It is evident from FIGS. 3 to 5 that the coded text only consists of alphabet letters and "space" signals, the "carriage return" and "line feed" signals being of course equivalent to a pair of "space" signals. Thus, the coded text can be transmitted in any desired manner.

The clear text can be fed directly into the coding apparatus by means of a teleprinter M, connected through a multiplex receiving distributor K and a storage unit L with the text input device A. In that case, however, the letter/figure shifting mechanism of the teleprinter M must be blocked since the clear text must contain letters only. The storage unit L serves to store any text information which is fed in by the teleprinter M while the text input device A is blocked during operation of the program unit J.

At the receiving station, decoding of the coded message may be effected, according to the equipment available, either by means of a mechanical or electromechanical decoding apparatus operating according to the 26-letter alphabet, which is not connected to the incoming line, or by means of an apparatus of the kind here described. In this latter case, since the apparatus is equipped with a multiplex receiving distributor K and with a storage device L, the coded text can be fed in directly from the incoming line. Otherwise, the incoming message must first be recorded on a tape (LS) by means of a receiving tape puncher and the tape run through the tape scanner A' of the text input device A. Of course it is further possible to have the incoming coded text printed and then to type it into the apparatus by means of the teleprinter M for decoding.

In the decoding process, the coded text introduced into the input device A either on a perforated tape LS, or direct from the incoming line, or by means of a teleprinter M, is converted into digital form by means of the code-transforming repeater C.

However, in contrast to the clear text, the coded text not only contains the 26 letters of the alphabet but also the "carriage return," "line feed" and "space" signals Nos. 27, 28 and 31 of the CCITT Code, and moreover the "letter shift" signal CCITT No. 29 which also will be delivered to the conductors of the strand *a* bearing the respective order numbers. In order to prevent these signals, which do not belong to the coded text proper, from entering the adding unit D and thereby causing the coded text and the key signals to fall out of synchronism, a detector I is connected to the 32-strand of conductors *a*. This detector may consist of relays, each responsive to one of the CCITT code siganls Nos. 27 to 32. In a manner similar to the relays of the counter H, each of these relays when energized may act through one connection line (of which for clarity's sake only the beginning and the end are shown) on the key input device B to lock it, and through another connection line on the circuit-breaker switch F to open it, so that no letter signal is delivered to the sending distributor G. A further connection line leads from the program unit J to the counter H to stop it as long as no letter is delivered by the sending distributor G. Thereby, it is made sure that only letters but none of the service signals Nos. 27 to 32 of the CCITT code will be mixed with any key information. Accordingly, the result of the decoding operation would not become affected even if the five-by-five grouping of the letters or the correct separation of lines in the coded text had become disturbed by technical signals which in the course of the transmission may have crept in. It matters only that the original sequence of letters is conserved, so that each letter can be brought together with the corresponding key signal.

In the decoding operation, the mixing of the coded letter information with the key information is performed in the same manner as the mixing of the uncoded letter infomation with the key information is effected in the coding operation described above. However, the first or "mixing" counter Z now also counts backwards as the second or "counting" counter counts backwards. Taking the example given above, the signals now coming in through the input device A and representing the coded letter "S" will be fed through the matrix C and the respective conductor of the strand *a* into the adding unit D, where it will step the first counter Z through 18 steps. At the same time, the decoding key signal "12" supplied by the key input device will step the second counter through 12 steps. In the mixing operation, the two counters will be stepped backwards through 12 steps until the second counter has reached its rest position again, and the first counter will then stop at 18 minus 12 steps, that is, in the position "6" corresponding to the original uncoded letter "F." This information is fed into the matrix E through the respective conductor of the strand *a+b*. It is clear therefore that, as far as only the letters are concerned, the original plain text is recovered at the sending distributor G.

Restoration of the orignal single spaces between words is automatically obtained in the decoded text since it is conventional in ciphered telecommunications to reserve one letter of the alphabet, which becomes coded and decoded like any other letter of the text, as a "space" signal. In the present example, the letter "W" is used for this purpose and for no other; therefore, whenever the letter "W" occurs in the plain text, it is replaced by "VV."

A special detector P is provided for substituting in the decoded text a "space" whenever the signal "W" appears at the output of the code-transforming repeater matrix E. This detector is a relay connected to the output of the matrix E and responsive to that signal "W." On the other hand, the detector P is connected to the input devices A and B and to the circuit breaker switch F through the same connection lines as the counter H, and to the program unit J. The arrangement is such that on the occurrence of the said signal "W" the detector relay P sends locking signals to the input devices A and B to temporarily stop their action, that it causes the circuit breaker switch F to open and interrupt the transmission of the "W" signal to the distributor G, and that it urges the program unit J to transmit the CCITT code signal No. 31 ("space") to the distributor G.

Moreover, the counter H is arranged to trigger the program unit J after having counted out about sixty letter signals from the matrix E. The program unit J in turn, is arranged to transmit, when so triggered, both the CCITT code signals No. 27 ("carriage return") and No. 28 ("line feed") to the distributor G the next time it receives a signal from the detector relay P. Another triggering signal is issued from the counter H to the program unit J on having counted out the sixty-ninth letter signal from the matrix E, whereby the program unit J is caused to deliver the two last-mentioned CCITT code signals independently of the detector relay P. At the same time, the counter H issues locking signals to the input devices A and B and an opening signal to the circuit breaker switch F as described before, to prevent the decoding, and transmission by the distributor G, of any letter signal while the said "carriage return" and "line feed" signals are transmitted. Thereby, it is practically avoided that at the end of a line a word is cut apart, since in the European languages words having more than nine letters are not frequent. If the printed means of a page printing device, the decoded text will appear in the shape represented in FIG. 6, which is the same as that represented in FIG. 2, except that the distribution of the words on the lines may be altered. It goes without saying that the automatic control of the carriage return and line feed could be adapted to the peculiarities of other languages and to other requirements.

With the described arrangement, it is also possible to decode and print into proper page shape any text which initially was coded by means of a coding apparatus not connected to the transmission line, in which coded text there usually is only a single space between groups of letters and in which the signals for carriage return and line feed may be missing since such independent coding devices mostly deliver the coded text in a continuous line on a tape. Due to the absence of spacing signals which occupy additional space and the transmission of which requires additional time, the duration of any Morse transmission which may be required is substantially reduced.

Where a direct line connection is available, the keying may be effected in binary code. The text input device A and the key input device B then should be constructed as five-unit code, five-channel transmitters. The adding unit D should comprise five binary counters. The control by the code transformer C, the counter H and by the program unit J and the supervision by the detector I will then be omitted. The text could be scanned from a perforated tape in which all 32 possible five-unit combinations may occur, or it may be typed in by means of a teleprinter comprising a full key set, in which case the storage unit L also becomes superfluous.

It must be noted that all teleprinter exchange positions, observation equipment may be switched in as a matter of official routine. Mostly, such equipment comprises a page printer. Now, such page printers "become confused" on receipt of coded text in the 32-symbol system since service symbols, including for instance "carriage return" alone and "line feed" alone, occur irregularly within the coded text. Observation of the transmission by the supervising staff therefore is rendered impossible, and the observation equipment switched in becomes unusable.

However, it is possible to modify the described apparatus so as to be able to communicate by means of a teleprinter key set without resorting to the 32-symbol system for coding. For instance, if the symbols "carriage return" and "line feed" are transmitted in uncoded form while the symbols "spacing," and "letter shift" (CCITT symbols Nos. 31 and 29, respectively) are transmitted in coded form, a 29-symbol system will be obtained. A coded text in this system if printed by a page printing device will contain pell-mell letters, figures, and technical service symbols but it always will be presented in clean lines. This will permit observation equipment to be switched in without imposing restrictions on the use of the teleprinters at both ends, a result which it is impossible to achieve with the 32-symbol system.

It must be emphasized that the conversion of the teleprinter symbols into the digital form by converting the symbols into trains of pulses have been explained by way of example only. There are many equivalent other means and methods available to those skilled in the art for carrying out the invention.

We claim:

1. Apparatus for coding and decoding texts which comprise only letters of an alphabet, comprising in combination:
    (a) text input means for representing the said letters of the text in teleprinter code, each by a symbol comprising a plurality of signals, said text input means including a plurality of delivery channels each for one of the signals constituting each letter symbol in the said teleprinter code;
    (b) a key signal generating unit operatable in synchronism with said text input means for generating digital signals according to a predetermined coding key, each signal being representative of a number;
    (c) a signal converting unit having a plurality of inlet channels each connected to one of the said delivery channels of the text input means, and means responsive to the signals received from the text input means through said inlet channels for generating digital signals each representing a position number, in the said alphabet, of the letter represented in the teleprinter code by the symbol comprising said signals received from the text input means;
    (d) a digital signal combining unit separately connected to said key signal generating unit and to said signal converting unit for receiving the respective digital signals generated therein, and including a calculating device responsive to the said two digital signals and adapted for generating a third digital signal representing the residue, to a modulus equalling the number of letters of the said alphabet, of a third number resulting from an algebraic operation involving the numbers represented by the said two digital signals; and
    (e) a signal reconverting unit connected to the said digital signal combining unit for receiving therefrom the said third digital signal and having a plurality of outlet channels each for one of the signals of each symbol representing a letter in teleprinter code, said signal reconverting unit including means responsive to each of said third digital signals for generating, and delivering through said outlet channels, the signals which jointly form the symbol of the letter the position number of which in the alphabet is represented by the said third digital signal.

2. Apparatus for coding and decoding texts which comprise only letters of an alphabet, comprising in combination:
    (a) text input means for binary signals representing the said letters of the text in a binary code in which a given number of permutations is provided each letter being represented by a symbol comprising a plurality of binary signals, said binary code comprising a number of permutations providing symbols exceeding the number of letters of the said alphabet, said text input means including a plurality of delivery channels each for one of the binary signals constituting each letter presenting symbol in the said teleprinter code;
    (b) key input means for generating binary signals representing the signs of a predetermined coding key each by a number of binary signals equal to the number of binary signals which each of the said letter-representing symbols comprises, said key input means including a plurality of delivery channels each for one of the said binary signals representing one of the signs of the key;
    (c) a binary signal combining unit including a plurality of combining elements each connected to one delivery channel of the text input means and one delivery channel of the key input means and having a single outlet channel, each such combining element being responsive to the binary signals received through the said two delivery channels and adapted to deliver through said outlet channel a third binary signal depending on whether the aforesaid two binary signals are equal or different, a plurality of said third binary signals constituting a letter-representing symbol.

3. Apparatus for coding and decoding texts according to claim 1, in which:
    (i) the said means responsive to the signals received from the text input unit through the said input channels of the signal converting unit are constructed for generating trains of electric pulses each comprising a number of pulses representing the said position number of the letter;
    (ii) the said key signal generating unit is constructed for generating trains of electric pulses each comprising a predetermined number of pulses according to the said key;
    (iii) the said digital signal combining unit comprises a repeating pulse counter having an inlet connected to said key signal generating unit for receiving the trains of pulses generated therein, another inlet connected to said signal converting unit for receiving the trains of pulses generated therein, an outlet connected to said signal reconverting unit for delivering thereto trains of pulses generated in the counter, said pulse counter comprising combined counting means for counting both the number of pulses in each train coming in from the key signal generating unit and in the associated train coming in from the signal converting unit, and pulse generating means controlled by said counting means for delivering through said outlet a third train of pulses comprising a number of pulses equal to the combined number of pulses counted by said combined counting means, said combined pulse counting means and said pulse generating means having, however, a limited combined counting and pulse generating capacity, respectively, which is equal to the number of letters comprised in the said alphabet, said counting means being adapted to count any further received pulses, and said pulse generating means being adapted to generate the corresponding number of third train pulses, starting anew from the number one, on the said combined counting capacity and the said pulse generating capacity becoming exceeded; and
    (iv) the signal reconverting unit comprises means responsive to each of said third trains of pulses for generating and delivering through the respective outlet channels, a set of signals jointly forming the symbol representing, in teleprinter code, the letter the position number of which in the alphabet is represented by the number of pulses of said third train of pulses.

4. Apparatus according to claim 1, which further comprises:
    (f) a sending distributor having a plurality of inlet channels each connected to the respective outlet channel of the signal reconverting unit, and a single outlet channel, said sending distributor being adapted to transmit sequentially through its said single outlet channel the several signals received in parallel through its said inlet channel.

5. Apparatus according to claim 4 which further comprises:
  (g) circuit breaker means disposed in the connection between each outlet channel of the signal reconverting unit and the corresponding inlet channel of the sending distributor;
  (h) a first blocking device for rendering said text input means inoperative,
  (i) a second blocking device for rendering said key signal generating unit inoperative;
  (j) a symbol counter connected to the outlet channels of the signal converting unit for counting the symbols transmitted from the signal converting unit,
  (k) signalling means associated with said symbol counter for delivering control signals in response to the counting action of said symbol counter each time the number of symbols counted has reached predetermined values,
  (l) programming means having a plurality of outlet channels each connected to one of the inlet channels of said sending distributor and adapted to generate and deliver thereto signals constituting predetermined operation-controlling symbols, said circuit breaker means, said first and second blocking devices, and said programming means being connected to said signalling means associated with the signal counter for receiving each at least certain of the said control signals, and controllable thereby.

6. Apparatus according to claim 5, in which the said circuit breaker means, first and second blocking devices are responsive to certain of the control signals delivered by said signalling means whereby on delivery of such control signals the transmission of signals from said signal reconverting unit to said sending distributor is interrupted and said text input means and key signal generating unit are rendered inoperative, while said programming means are responsive to the same said control signal for generating, and supplying to the sending distributor, signals constituting certain of the said operation-controlling symbols.

7. Apparatus according to claim 5 in which the said symbol counter and said signalling means are adjustable for predetermining the number of symbols counted by said counter at which each control signal is to be delivered by said signalling means, and said programming means are adjustable for predetermining the operation-controlling symbol which is to be delivered by said programming means in response to the occurrence of such control signal.

8. Apparatus according to claim 7 in which the said symbol counter, signalling means and programming means are adjustable to a coding condition in which the signalling means are set for delivering a first control signal after each fifth symbol, and a second control signal after each fiftieth symbol counted by the symbol counter, in which said circuit breaker means, and said first and second blocking devices are responsive both to said first and second control signals, whereby on occurrence of each of these signals the transmission of signals from said signal reconverting unit to said sending distributor is interrupted and said text input means and key signal generating unit are rendered inoperative, and in which the programming means are set for delivering to the sending distributor twice a symbol for "spacing" in response to the occurrence of the said first control signal, and once the symbol for "carriage return" and once the symbol for "line feed" in response to the occurrence of the said second control signal.

9. Apparatus according to claim 7 and further comprising:
  (m) a spacing symbol detector connected to said signalling means associated with the symbol counter for receiving therefrom an activating control signal, to the said outlet channels of said signal reconverting unit for sensing the signals transmitted therefrom, and also connected to said circuit breaker means, first and second blocking devices and programming means for delivering secondary control signals thereto, said spacing symbol detector being responsive to said activating control signal for on occurrence thereof becoming responsive to the occurrence of the conventional symbol for "spacing" among the symbols transmitted from said signal reconverting unit, to deliver said secondary control signal, said symbol counter, signalling means and programming means being adjustable to a decoding condition in which the signalling means are set for delivering said activating control signal to said spacing symbol detector after the sixtieth symbol, and another control signal after the sixty-ninth symbol counted by the symbol counter, said circuit breaker means, said first and second blocking devices and said programming means being responsive both to said secondary control signal delivered by the spacing signal detector and to said other control signal delivered by the said signalling means, whereby on occurrence of either of these two control signals, whichever occurs first, the transmission of signals from said signal reconverting unit to said sending distributor is interrupted and said text input means and key generating unit are rendered inoperative, and in which the programming means are set for delivering in response to the same one of the said two control signals, once the conventional symbol for "carriage return" and once the convention symbol for "line feed."

10. Apparatus according to claim 5 and further comprising:
  (n) a detector connected to the outlet channels of the signal converting unit for sensing the signals transmitted therefrom, and also connected to said circuit breaker means, second blocking means and symbol counter, said detector being responsive to digital signals other than those representing letters for delivering a blocking signal to said circuit breaker means, second blocking means and symbol counter whenever such other digital signals occur, whereby on occurrence of said blocking signal the transmission of signals from said signal reconverting unit to said sending distributor is interrupted and said key generating unit and symbol counter are rendered inoperative.

11. Apparatus as claimed in claim 1 in which said text input means includes a perforated-tape scanner.

12. Apparatus as claimed in claim 1 in which said text input means comprises a receiving distributor.

References Cited by the Examiner
UNITED STATES PATENTS
2,874,215   2/1959   Zenner _____ 178—22

NEIL C. READ, *Primary Examiner.*